No. 847,165. PATENTED MAR. 12, 1907.
W. B. COWLES.
BULKHEAD DOOR, HATCH, OR OTHER BARRIER.
APPLICATION FILED AUG. 18, 1905.

Witnesses
W. Max. Duvall
Martin T. Fisher

Inventor.
W. B. Cowles
by his Attorneys
Wickman & Fisher

UNITED STATES PATENT OFFICE.

WILLIAM BARNUM COWLES, OF CLEVELAND, OHIO, ASSIGNOR TO THE LONG ARM SYSTEM COMPANY, OF CLEVELAND, OHIO, A CORPORATION OF OHIO.

BULKHEAD-DOOR, HATCH, OR OTHER BARRIER.

No. 847,165.   Specification of Letters Patent.   Patented March 12, 1907.

Application filed August 18, 1905. Serial No. 274,747.

*To all whom it may concern:*

Be it known that I, WILLIAM BARNUM COWLES, a citizen of the United States, residing at Cleveland, in the county of Cuyahoga and State of Ohio, have invented certain new and useful Improvements in Bulkhead-Doors, Hatches, or other Barriers; and I do hereby declare the following to be a full, clear, and exact description of the invention, such as will enable others skilled in the art to which it appertains to make and use the same.

My present invention relates to improvements in apparatus for electrically operating bulkhead-doors or hatches or other barriers, and it is more especially intended to provide improved means for the operation of watertight bulkhead-doors and hatches aboard ship, where the current-supply is more or less limited, where the space available for the installation of the apparatus is exceedingly contracted, and where it is especially desirable to avoid wastefulness in the use of current and to facilitate the maintenance of the apparatus in operative condition.

This invention more especially relates to means for controlling the operation of the motor at each door or hatch either from a distance in groups, or singly, locally at each door or hatch.

This invention relates to part of the apparatus illustrated and described in my application, Serial No. 216,142, filed July 11, 1904, and entitled Electric system for operating bulkhead-doors, hatches, &c., and it shows such parts as are herein described and claimed in greater detail than they were shown in my earlier application aforesaid. That application more especially described and claimed the mechanical means for operating the door, whether by hand or electrically, the means for operating the automatic cut-out, and various other details of construction which are not claimed herein.

The present case is intended to cover more especially the motor control irrespective of the mechanical means for moving the door or hatch by hand-power and irrespective of the automatic cut-out mechanism and other details of construction claimed in my application, Serial No. 216,142, aforesaid.

My invention will be understood by reference to the accompanying drawings, in which the same parts are indicated by the same letters and numerals throughout the several views.

Figure 1:
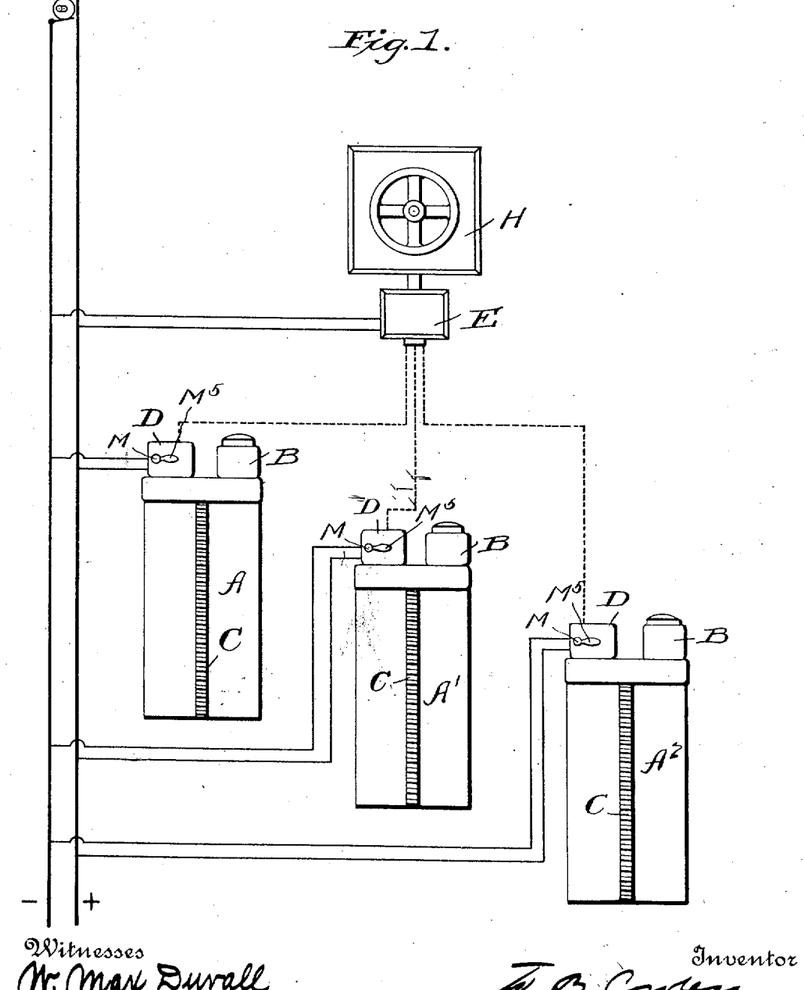
Figure 1 shows diagrammatically the electrical connections between three doors and the ship's mains and between the said mains and doors and the central or emergency station.

Referring first to Fig. 1, A, A', and $A^2$ represent three doors, which are provided with suitable electric motors B, driving-gearing engaging in the rack C, secured to the door. The gearing between the motor and the rack is fully described in my application aforesaid; but any suitable gearing may be employed, if desired.

D represents the controller-box secured to the door-frame. H represents the central or emergency station, which is connected both to the mains and to the controllers at the door through the fuse-box E.

I have shown three doors connected to a single emergency-station; but it will be obvious that the number of doors connected to such station may be varied at will and that there may be a plurality of stations each operating a group of doors, or the same groups of doors may be operated from two or more emergency-stations—as, for instance, from emergency-stations located near each end of the ship.

In systems of this character it is essential that the apparatus shall be operated either electrically from a distance or that it shall be operated electrically from a hand control located at or near each door or hatch, and also that it shall be operated by mechanism wholly operated by hand. This hand-operating mechanism is not a part of my present invention, it being fully described in my application, Serial No. 216,142, aforesaid.

As before stated, my present invention relates more especially to the apparatus whereby the door or doors may be operated by electroresponsive means from a distance or may be controlled by hand-control switches located at or near the door.

In the operation on board ship it has been found in practice that it is desirable only to close the door from a distance, but the mechanism must permit of the local control of the door for either opening or closing, and the apparatus must be such that the local control can dominate the distant control. In other words, if the door is in the act of closing under the distant control, the system must permit of a man at the door opening that door in opposition to such distant control.

Figure 2:
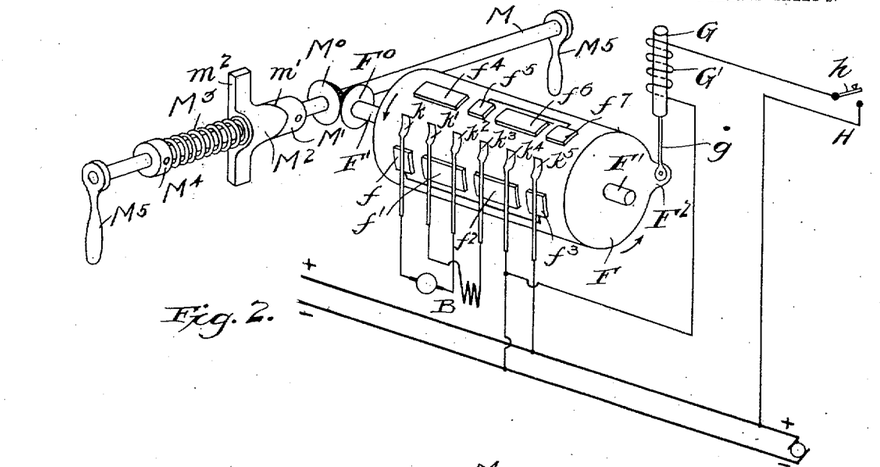
Fig. 2 is a perspective view showing the controller in its simplest form and adapted to be operated either locally by hand or from a distance by electroresponsive means. In this figure many of the parts are omitted for the sake of clearness in the drawings.

In Fig. 2 I have shown a form of controller which is operated by a solenoid through a circuit closed at the distant point H and which may be also controlled by hand-operated gearing locally, the hand control dominating the distant control. In this form of device the controller is normally brought back to the off position by means of a suitable centralizing-spring. Referring more specifically to the details of this figure, F represents the controller-drum, mounted upon the shaft F' and provided with a plurality of conducting-segments $f$ to $f^7$. The controller-drum carries a lug or arm $F^2$, which is connected by the rod $g$ to the solenoid-core G, the coils G' of which are connected to the central station H. Thus it will be seen that the controller may be rocked by this solenoid, causing its conducting-segments to engage with the conducting-fingers $k$ to $k^5$, and thus completing the circuit through the motor at the door, as will be hereinafter described.

The shaft F' carries at its outer end the bevel-gear $F^6$, which meshes with the bevel-gear $M^0$, fast on the shaft M, passing through bulkhead and journaled in bearings. (Not shown.) This shaft carries a set-collar M', having double cam-faces $m'$, which engage corresponding cam-faces on the sliding collar $M^2$, which is held against turning on the shaft, as by means of the wings $m^2$, which slide along any suitable guide-face (not shown) on the controller-box or bulkhead. Between this sliding collar $M^2$ and the set-collar $M^4$ is a stout spring $M^3$, and at each end of the shaft M, one on each side of the bulkhead, are handles $M^5$. By turning either handle in either direction the sliding collar $M^2$ is wedged back against the spring $M^3$, compressing the same, and when the handle is let go the sliding collar $M^2$, engaging the cam-faces $m'$, will snap the handles back to the initial position. This is a form of centralizer employed by me; but any other form of centralizer may be used, if desired.

It will be seen that by turning the handles $M^5$ the controller-drum may be rocked in either direction, while it may be rocked in one direction only (the direction for closing) by means of the solenoid.

The parts are shown in the off position and none of the circuits closed. Now if the drum be rocked in the direction of the arrow for closing, which may be done either by the hand control or by the solenoid, the contact-fingers $k$ to $k^5$ will make contact with the contact-segments $f^4$ to $f^7$, and the circuit will be completed as follows: from the positive main to the finger $k^5$, contact-segment $f^7$, contact-segment $f^5$, finger $k^2$, armature-coils of the motor B, finger $k$, contact-segment $f^4$, finger $k'$, field-coils of the motor B, contact-finger $k^3$, segment $f^6$, and finger $k^4$ to the negative main.

The controller-drum may be moved by hand, as stated, with the switch $h$ at the emergency-station H open; but if this switch $h$ be closed, the controller-drum being in the position shown in Fig. 2, the emergency-circuit will be completed from the positive main to the switch $h$, to the solenoid-coils G', and thence to the negative main. This will energize the solenoid, which will rock the controller to the closing position.

It will be seen that the operation of the controller by hand or by the electroresponsive means from a distance are entirely independent of each other; but if the power applied by the hand mechanism is greater than that applied through the solenoid the hand control may dominate the solenoid control.

It will be seen that the drum will be rocked by the solenoid to close the door, and it may also be rocked by the hand-gear to close the door independently of the solenoid. Furthermore, it may be rocked by the hand-gear to open the door, whether the solenoid is energized or not, provided the power of the man at the door is sufficient to overpower the solenoid. Thus, whether the solenoid is energized or not, if the man at the door rocks the controller-drum to the position for opening he will cause the contact-segments $f$, $f'$, $f^2$, and $f^3$ to make contact with the fingers $k$ to $k^5$, respectively, and the current will then flow in the reverse direction from the positive main through the finger $k^5$ to the segment $f^3$, thence to the segment $f$, thence through the armature-coils of the motor to the finger $k^2$, thence through the segment $f'$ to the finger $k'$, thence through the series field-coils of the motor to the finger $k^3$, thence through the segment $f^2$ to the finger $k^4$ and back to the negative main.

If the shaft of the controller projected through the bulkhead, this shaft might be turned by a hand-crank or hand-wheel without the interposition of any gearing; but as a matter of convenience it is preferable to have the controller-box secured to the door with the controller-shaft parallel to the bulkhead, in which case gearing is required, and since it is necessary to operate the controller from either side of the bulkhead, a hand-control shaft passing through the bulkhead and fitted at each end with a hand wheel or handle is required.

With the form of controller shown in Fig. 2 it will be noted that when said controller is operated from the distant or emergency station the solenoid must not only turn the controller through the requisite angle, but it must also operate the hand-gearing and incidentally must turn the hand wheels or the handles, and in so doing it must overpower the centralizer. This would require a very strong solenoid under even normal conditions; but if either of the handles was obstructed from turning, as might happen from contact with coal or other parts of the cargo of a ship or other obstructions, then the solenoid would not be able to turn the controller at all, and consequently the distant operation would fail altogether. To avoid these conditions, it has been found in practice more convenient to cause the solenoid to move a portion only of the controller-switch, but to have the parts so arranged that this movement of a portion of said switch would accomplish the same results as if the whole of said switch were turned.

Figure 3:
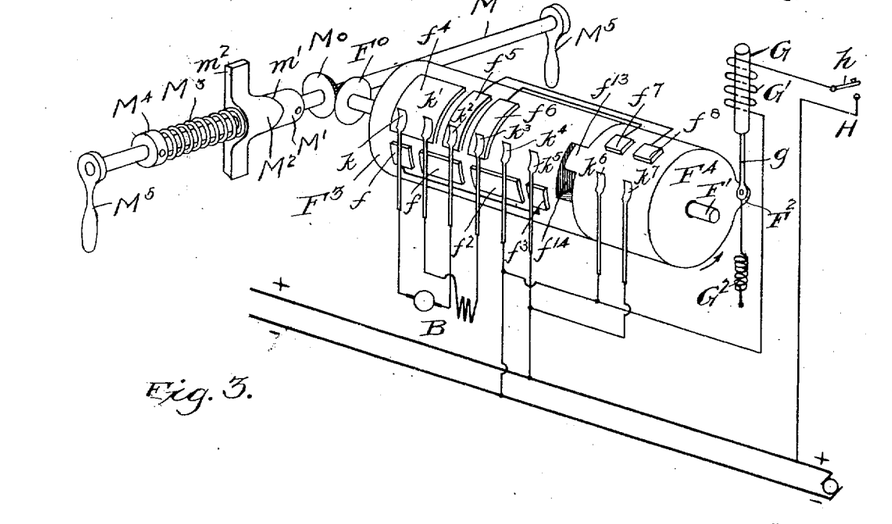
Fig. 3 is a perspective view of a modified form of controller, which may be operated either locally by hand or from a distance by electroresponsive means and in which it is not necessary to move the entire drum of the controller, as well as the hand-operating means, by said electroresponsive means. Parts have been omitted from this figure also for the sake of clearness.
Figure 4:
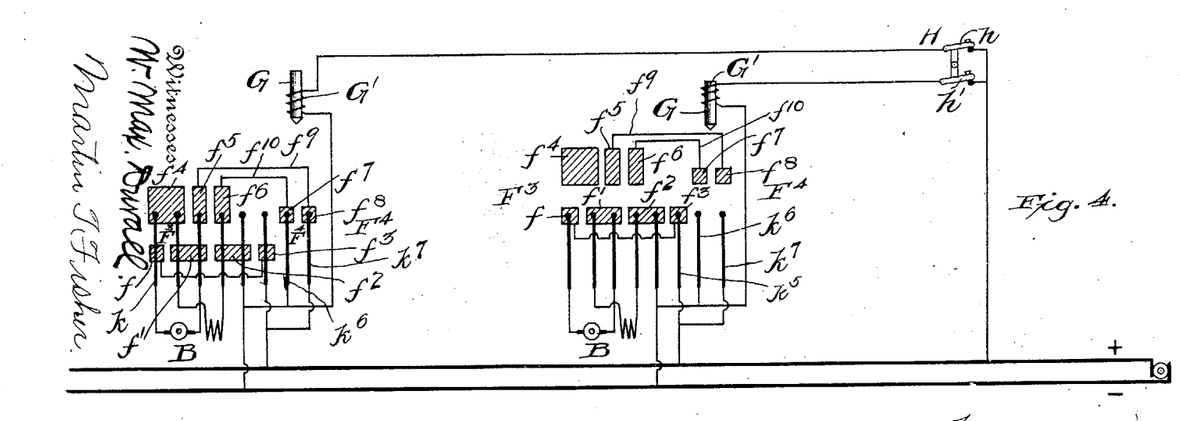
Fig. 4 is a diagram, showing the controllers constructed according to Fig. 3, of two doors connected to the central station with the circuits at said station closed, the controller of the left-hand door being in the position when it is acted upon for closing by the electroresponsive means and the controller for the other door being in the position when the electroresponsive means is overpowered by the hand control and when the door is opening under the action of said hand control.
Figure 5:
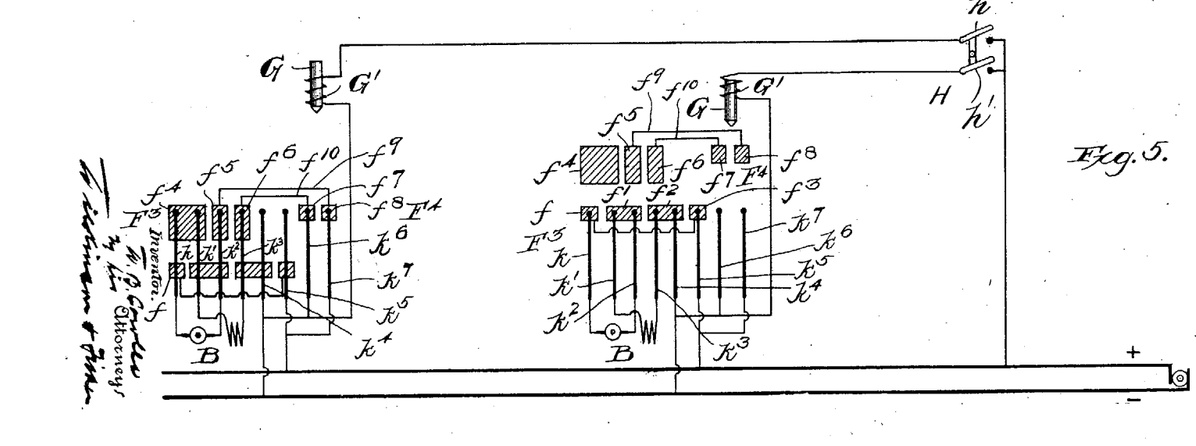
Fig. 5 shows the development of the controllers constructed according to Fig. 3 at two doors, the circuits to the central station being broken and the first door being in the act of opening by hand control, while the second door is in the act of closing by hand control.
Figure 6:
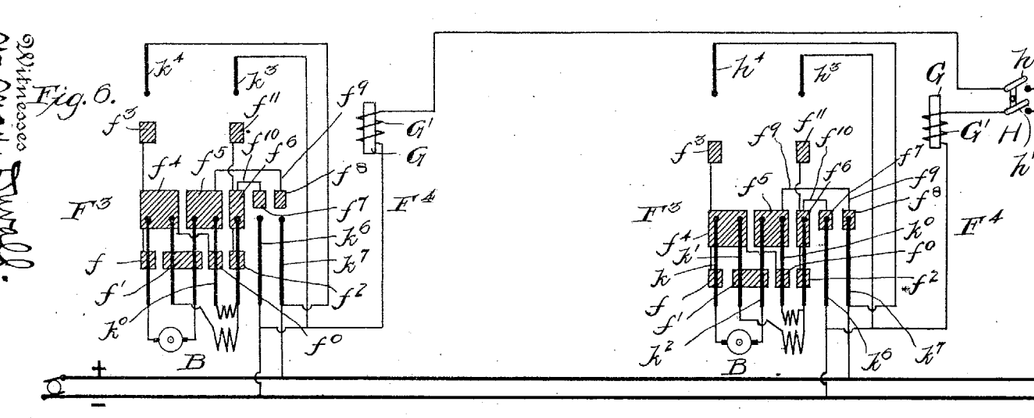
Fig. 6 shows diagrammatically an emergency-station and the controller connections of two doors using a compound wound motor, the circuits to the emergency-station being open and the controller at the left-hand door being shown in the off position and that at the right-hand door being shown as closing by hand control.
Figure 7:
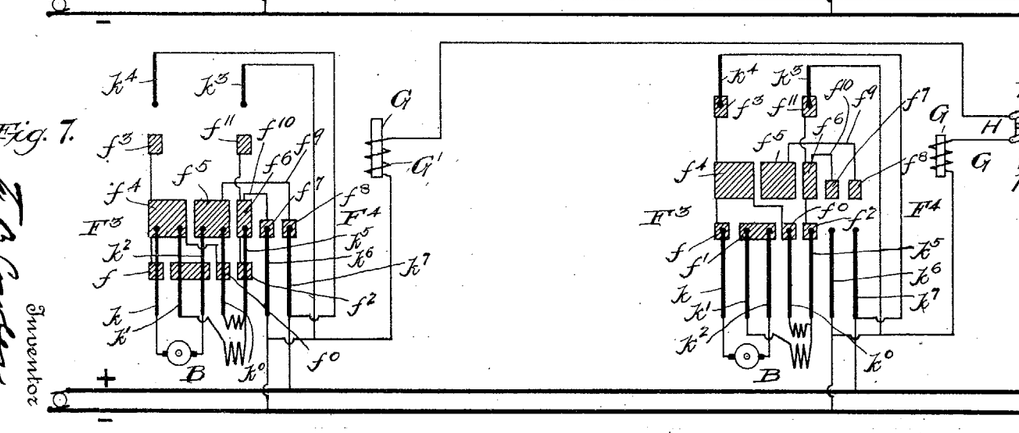
Fig. 7 is a similar diagram to that illustrated in Fig. 6, but showing the left-hand door as closing by emergency and the right-hand door as opening by the hand control overpowering the emergency control.
Figure 8:
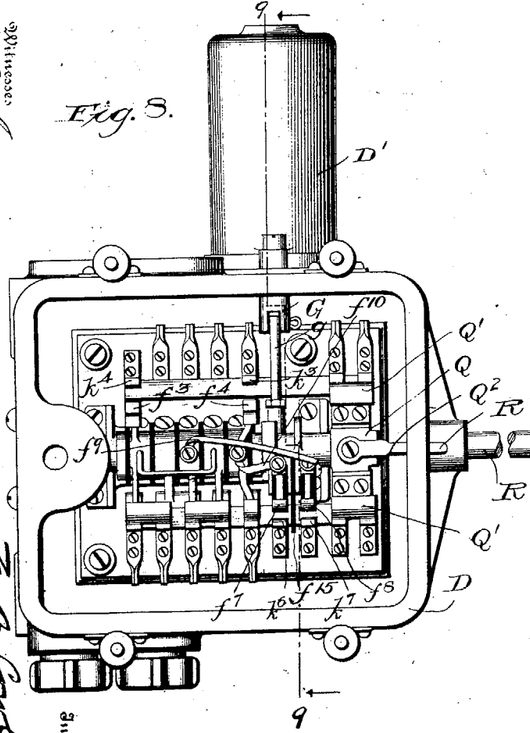
Fig. 8 is a front elevation of the controller shown diagrammatically in Figs. 6 and 7, with certain additional parts not essential thereto.
Figure 9:
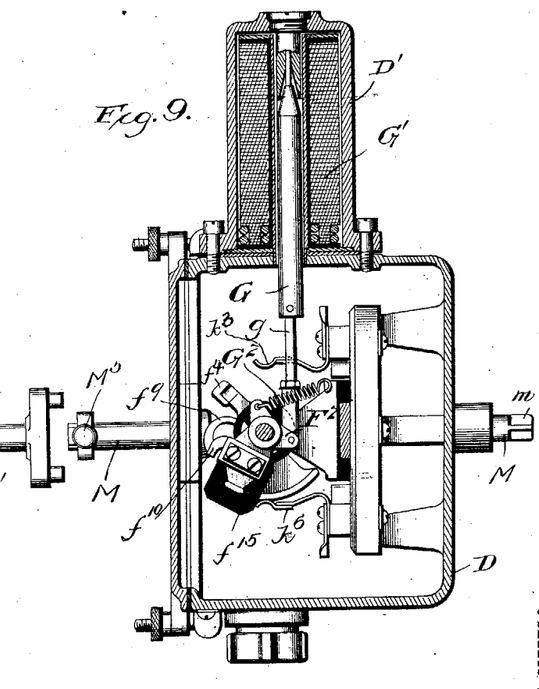
Fig. 9 shows a section along the line 9 9 of Fig. 8 looking in the direction of the arrows.

To obviate the objections just stated with regard to the device shown in Fig. 2, I have devised the form of controller-switch shown in outline in Fig. 3 and illustrated diagrammatically in Figs. 4 and 5, which, with slight alterations is shown diagrammatically in Figs. 6 and 7 and is shown in detail in Figs. 8 to 11. This controller-switch and the means for operating the same will now be described.

Referring first to Fig. 3, the controller-drum is made in two parts $F^3$ and $F^4$, in which the part $F^3$ is fast on the shaft $F'$ and $F^4$ is loose on said shaft, but is provided with a tenon $f^{13}$, projecting into a radial slot $f^{14}$ in the member $F^3$. The member $F^3$ of the drum is held in place by the centralizer, which, as shown, is precisely of the same construction as that already described with reference to Fig. 2, while the member $F^4$ is held in the off position by means of the spring $G^2$, which tends to pull the lug $F^2$ down, causing the stop $f^{13}$ to engage the end of the slot $f^{14}$. This spring should be strong enough to restore the parts to the initial or off position when the emergency-circuit is open, but weak enough to be dominated by the solenoid core $G$ when the emergency-circuit is closed. It will be seen that the member $F^3$ is normally in position for closing the circuit for closing the door while the member $F^4$ is normally in the off position and that the member $F^4$ may be rocked, by means of the solenoid, to the position for completing the circuit for closing regardless of the hand control; but at the same time it may be rocked by means of the hand control against the action of the solenoid-spring to close the circuits for opening the door. Thus it will be seen that the whole controller-switch is rotated by the hand-gear, but a portion of said switch only is rotated by the solenoid, and it only becomes necessary to arrange the contact-fingers and the segments on the controller in such a manner that the turning of a part of the controller-switch may complete the circuit through the motor at the door. In other words, instead of having the controller-switch close all the contacts in the circuit at one operation it is sufficient to have a number of these contacts normally closed, leaving one or more open, and then closing that one or more by the solenoid or other electroresponsive means.

In Fig. 3 I have shown eight contact-fingers $k$ to $k^7$, while in Fig. 2 only six of these contact-fingers are shown; but this additional pair are merely added as a matter of mechanical convenience. The same circuits might be completed with six contact-fingers engaging a divided controller-drum as well as with six contact-fingers engaging an integral controller-drum.

In Fig. 3 the controller is shown in the off position, and in the development of said controller shown in Figs. 4 and 5 the controller is shown in the various operative positions.

Referring first to Fig. 4, the controller at the left-hand side of said figure shows the door in the operation of closing under the control of the switch $h$ at the emergency-station H, which has caused the solenoid-core G to move the contacts $f^7$ and $f^8$ on the member $F^4$, which are electrically connected by flexible conductors $f^9$ and $f^{10}$ to the segments of the divided drum into position to contact with the fingers $k^6$ and $k^7$. The circuit through the motor of the door will then be closed as follows: from the positive main to the contact-finger $k^7$, to the segment $f^8$, thence through the flexible connection $f^9$ to the segment $f^5$, thence through the armature of the motor B to the segment $f^4$, thence through the field of the motor to the segment $f^6$, thence through the flexible connection $f^{10}$ to the segment $f^7$, thence through the contact-finger $k^6$ to the negative main. The circuit through the solenoid from the emergency-station will be from the positive main to the closed switch $h$ at the emergency-station H and through the solenoid-coils G' and thence back to the negative main. The controller at the right-hand side of Fig. 4 is shown as in the opening position under hand control and overpowering the electroresponsive control. The circuit through the motor will in this case be as follows: from the positive main through the contact-finger $k^5$ and segment $f^3$ to the segment $f$, thence through the armature of the motor B to the segment $f'$, thence through the field-coils of the motor to the segment $f^2$, and thence to the negative main. It will be seen that while the circuit is thus completed through the motor the circuit through the solenoid-coils will still remain closed or in the same position as indicated at the left of Fig. 4. In other words, the current will flow from the positive main through the closed switch $h'$ at the emergency-station H, through the solenoid-coils, and down to the negative main, as before. Thus it will be seen that when the controller-switch is turned by hand to the position for opening the door the operator must manually overpower the effect of the solenoid, but without disturbing the circuit through the solenoid.

Fig. 5 shows the controllers at two doors with the emergency-circuits both broken. The controller at the left of said figure is indicated as in the position for electrically operating the door for closing under the hand control. In this case as the controller-drum is rotated in the direction for closing the elongated segments $f^4, f^5$, and $f^6$ will remain in connection with the contact-fingers $k, k', k^2$, and $k^3$ until the limit of travel of the controller in this direction is reached. At the same time the member $F^4$ of the controller-drum will be rocked by the stop $f^{13}$, engaging in the end of the slot $f^{14}$ (see Fig. 3) until the contact-segments $f^7$ and $f^8$ engage the contact-fingers $k^6$ and $k^7$. Thus it will be seen that the hand operation of the controller will accomplish the same result as the electroresponsive means in bringing these contact-segments $f^7$ and $f^8$ into contact with the fingers $k^6$ and $k^7$, as already described with reference to Fig. 4.

Although the segment $F^3$ of the drum has been rotated through an angle from the position shown to the left in Fig. 4, still the circuits are closed in precisely the same manner as in the diagram to the left of Fig. 5 as in the diagram to the left of Fig. 4, and therefore it will be seen that the movement by the solenoid of a portion only of the controller-drum accomplishes precisely the same results in closing the circuits as the movement of the whole of the controller-drum by hand. Thus it will be seen that when the electromagnet operates the controller it moves only a portion of the controller without disturbing the hand-gearing at all, which is a very great improvement over the device shown in Fig. 2, where it is necessary for the electromagnet to move the hand-gearing and to overcome the resistance of the centralizer.

In the controller shown to the right of Fig. 5 the parts are in the position for opening the door under the hand control, the emergency-switch $h'$ being open. In this case the circuits are precisely the same as those in the diagram of the controller at the right of Fig. 4, except that in Fig. 4 the emergency-switch is closed, while in Fig. 5 it is open. It will be evident from both of the diagrams referred to that the emergency-circuit does not affect the action of the controller in the operation of opening the door.

The diagrams shown in Figs. 4 and 5 illustrate a series-wound motor; but where it is desired to use a compound-wound motor the arrangement of the controller-segments and contact-fingers may be varied to suit altered conditions. With the information given with reference to Figs. 3 to 5 such a modified arrangement would be a mere matter of mechanical skill. Such an arrangement is illustrated in Figs. 6 to 11.

Referring first to Figs. 6 and 7, these show diagrammatically a compound-wound motor operated in precisely the same way as has already been described with reference to the diagrams shown in Figs. 4 and 5. The only material changes made in the controller shown in Figs. 4 and 5 are the addition of a finger $k^0$ for the shunt field-circuit of the motor, the widening of the contact-segment $f^5$ to engage said finger, the addition of the contact-segment $f^9$ to engage this contact-finger $k^9$, the transfer of the fingers $k^3$ and $k^4$ to the back of the commutator-drum, and the shifting of the contact-segment $f^3$ to the back of the drum and also shifting part of the contact-segment $f^2$ to the back of the drum, as indicated at $f^{11}$. This shifting of the contact-segments and fingers to the back of the drum is merely to enable a shorter drum to be used and does not in any way affect the operation of the device. Furthermore, the addition of the contact-finger $k^9$ and adjusting the segments to correspond is merely to throw in another circuit for the shunt field-coils.

The operation of the controller shown in Figs. 6 and 7 is precisely similar to that already described with reference to Figs. 4 and 5.

Referring to Fig. 6, the left-hand controller is shown in the off position, the circuit through the motor and its shunt and field coils being complete, except that the segments $f^7$ and $f^8$ are free from engagement with the fingers $k^6$ and $k^7$, thus breaking the circuit to the mains. Furthermore, the emergency-switch $h$ is open. In the controller to the right of Fig. 6 the emergency-switch $h'$ is also open; but the controller is shown in position for closing the door under hand control. Thus the elongated segments $f^4$, $f^5$, and $f^6$ have been moved down, but are still in engagement with the corresponding contact-fingers, while the short segments $f^7$ and $f^8$ on the part F⁴ of the controller-drum have also been moved down under the hand control, making contact with the fingers $k^6$ and $k^7$. Thus the circuit will be completed from the positive main and the finger $k^7$ to the segment $f^8$, through the flexible connection $f^9$ to the segment $f^5$. Thence part of the current goes through the finger $k^9$ and the shunt field-coil to the finger $k^5$ and thence through the flexible connection $f^{10}$ to the finger $k^6$ and back to the negative main. The balance of the current from the segment $f^5$ passes through the finger $k^3$, the armature-coils of the motor B, and the finger $k$, to the segment $f^4$. Thence it travels through the finger $k'$ to the series coil of the motor and thence to the finger $k^5$, where it joins the shunt-current and returns to the negative main with it.

In the two diagrams shown in Fig. 7 the left-hand controller is shown in the position it assumes when the door is closing by emergency action, and the diagram to the right of Fig. 7 shows the emergency-circuit closed, with the parts in the position assumed when the door is opening under hand control in opposition to the emergency control.

It will be noted in this figure that both of the emergency-switches $h$ and $h'$ are closed and that the current flows continuously through the solenoid-coils G', tending to rock the member F⁴ of the controller to the position for completing the circuits for closing. In the left-hand diagram this is effected as follows: The current flows from the positive main through the finger $k^7$, the contact-segment $f^8$, the flexible connection $f^9$ to the segment $f^5$, where it divides, part flowing through the armature of the motor and the rest flowing through the shunt-coils, the combined currents so divided finally reaching the negative main through the finger $k^5$, the segment $f^6$, the flexible connection $f^{10}$, and the finger $k^6$, as already described.

In the diagram shown to the right of Fig. 7 both members of the controller-drum have been rocked by the hand control to the position for opening the door against the action of the centralizer and also against the action of the solenoid, and the solenoid-circuit still remains closed.

The current will flow as follows: from the positive main to the finger $k^4$ on the back of the drum, thence through the contact-segment $f^3$, also on the back of the drum, to the segment $f^4$, thence to the armature and shunt coils of the motor, respectively, through the segments $f$ and $f^6$, and the fingers $k$ and $k^6$, respectively. From the armature-coils it passes through the finger $k^2$ and segment $f'$ to the finger $k'$, thence through the series coils of the motor to the finger $k^5$, where it joins the current from the shunt-circuit and, entering the segment $f^2$, passes to the segment $f^6$, thence to the segment $f^{11}$ and finger $k^3$, both at the back of the drum, and thence back to the negative main.

It will be seen that the moment the hand control is released the centralizer and solenoid will return the two members of the drum back to the position shown in the diagram to the left of Fig. 7, and therefore if this hand control be released during the act of opening the door, the emergency-circuit still being closed, the door will automatically close.

The controller illustrated diagrammatically in Figs. 6 and 7 is shown in detail in Figs. 8 to 11. In these figures I show not only the controller-drum and its connections, but in the box containing the controller I show the limit-switch, which is intended to automatically cut off the current from the motor, as is described in my application Serial No. 216,142 aforesaid.

It will be obvious that where a large number of doors are used aboard ship and there are no other automatic means for cutting off the current from the doors when they are closed by emergency that the current will continue running through all of the motors at all of the doors, not only unnecessarily heating up the motors, but more especially causing a great waste of current and throwing on unnecessary load on the ship's mains.

The supply of current aboard ship being necessarily limited and there being a number of other appliances intended to be operated by electricity in case of emergency, this waste of current would come at a most inopportune time, and therefore I provide means whereby this current is cut off at each door just as soon as that door is closed or just as soon as that door reaches an obstruction which will prevent it from closing. In this way little more current is used for closing each door than is necessary and the drain on the ship's mains is kept down to a minimum. Of course this automatic cut-out has nothing to do with the operation of the motor or of the controller or of the emergency-station, and it can be omitted; but it should preferably be included for the reasons already stated. This inclusion of the limit-switch in the controller-box is a mere matter of convenience, as the same might be placed anywhere else. The limit-switch is indicated by the drum Q and the contacts Q', which drum is rocked by the arm Q² engaging the crank R on the rock-shaft R', whose operation is fully disclosed in my application Serial No. 216,142 aforesaid and will not be further referred to herein.

The controller-box D is preferably made dust and water tight and carries a casing D' for the solenoid-coils G'.

The controller-drum is made in two sections F³ and F⁴, and the part F³ is notched, as at $f^{14}$, (see Fig. 11,) to engage the stop $f^{13}$ of the part F⁴. The two parts are electrically connected together by means of the flexible connections $f^9$ and $f^{10}$. (Shown most clearly in Figs. 8 and 9.) The smaller part F⁴ of the controller-drum is connected to the core of the solenoid by the rod $g$, and this part of the controller-drum is restored to the initial position by means of the spring G². The insulating-plate $f^{15}$ is provided between the contact-segments $f^7$ and $f^8$ to prevent sparking when the current is turned on. The various contact-fingers and contact-segments are shown diagrammatically in Figs. 6 and 7 and are correspondingly lettered as far as practicable on Figs. 9 to 11.

Figure 10:
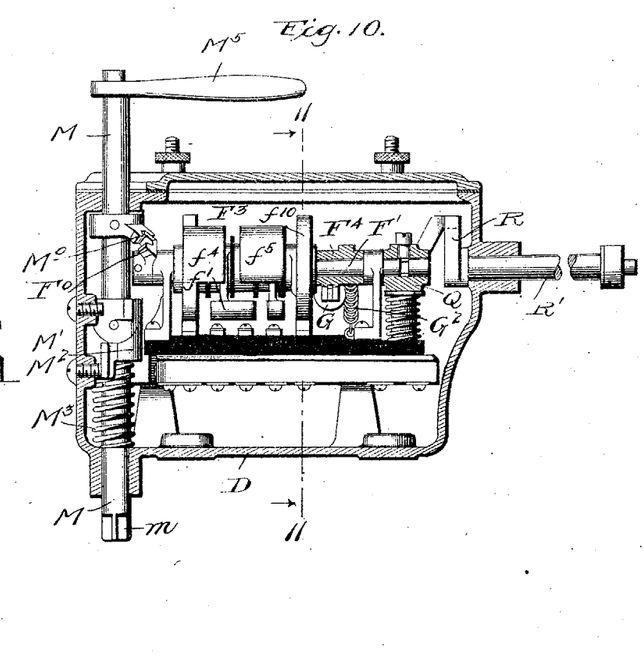
Fig. 10 shows a section through the controller-box along the axis of the hand-control shaft, parts being shown in elevation.
Figure 11:
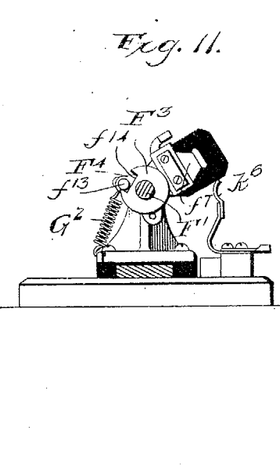
Fig. 11 shows a section along the line 11 11 of Fig. 10 looking in the direction of the arrows.

Inasmuch as the hand-control shaft M needs to be rocked only through a small angle in place of the bevel-gears M⁰ and F⁰, shown in Figs. 2 and 3, I provide bevel-segments, as shown at M⁰ and F⁰ in Fig. 10, the rest of the gear-teeth being omitted.

The operation of the hand control is precisely the same as has been described with relation to Figs. 2 and 3.

In Fig. 10 one of the handles is omitted to show the squared end $m$ of the hand-control shaft M.

It will be obvious that the embodiment of my invention as illustrated in Figs. 8 to 11 may be varied within wide limits without departing from the spirit of the said invention.

It will be seen that in the forms of controller illustrated in Figs. 3 to 11 the controller includes a manually-operated reversing-switch, which is normally held in one operative position, and a coacting switch, which may be either magnetically operated from a distance or manually operated through the mechanism for operating the reversing-switch, and that this second switch operates only to close the door and has nothing whatever to do with the operation of opening the door.

While I have illustrated the doors as operated simultaneously in groups, where a large number of doors are to be operated aboard ship the simultaneous operation of all of these doors would be too heavy a drain upon the ship's dynamos, and it has been found more practicable to operate the doors *seriatim* with very short intervals between the starting of each door or doors, and for this purpose I have devised the step-by-step mechanism shown in my application Serial No. 216,142 as aforesaid; but I intend the claims herein to cover either the operation of the doors singly or simultaneously in groups or *seriatim* in groups.

I claim, broadly, as new—

1. In combination, a system of doors, a motor for operating each door, a controller for each motor, a control system comprising a distant station and operating means for the several controllers controlled from the distant station, and connection between each controller and its operating means, whereby each controller may be moved without disturbing the operating means, substantially as described.

2. In combination, a system of doors, an electric motor for operating each door, a controlling-switch for each motor, a control system comprising electroresponsive operating means for the several controlling-switches, control-wires extending to a distant station and switches at said distant station, and hand-operated mechanism, whereby each controlling-switch may be moved without disturbing the operating means or disturbing the connections of the control system, substantially as described.

3. In combination, an electric motor, a reversing-switch for said motor, an operating-handle for said switch, a switch-moving member arranged to maintain said switch normally in its off position and means adapted to be actuated from a distant point to move a portion of said switch from its off position into one of its operative positions, and yielding means normally maintaining said reversing-switch in a fixed position with reference to said switch-moving member, substantially as described.

4. In combination, a manually-operated switch having a plurality of operative positions, means for maintaining said switch normally in its off position, and means controllable from a distance and adapted to shift the position to which a portion of said switch is returned when manually released, substantially as described.

5. In combination, a manually-operated switch composed of two independently-movable parts with means for moving both parts simultaneously by hand, means for maintaining said switch normally in its off position, and means controllable from a distance and acting upon one of the parts of said switch to move the same independently of the hand-operated means, with automatic means for restoring said parts to the initial position when released from the distant control, substantially as described.

6. In combination, a switch, an operating-handle therefor, yielding means for maintaining said switch normally in its off position, and a distant-control system comprising electrically-operated means for shifting the point to which a portion of the switch tends to return when the operating-handle is released, substantially as described.

7. In combination, a switch, an operating-handle therefor, yielding means for maintaining said switch normally in its off position, a distant-control system comprising electromagnetically-actuated means for shifting the point to which a portion of the switch tends to return when the operating-handle is released, and a switch at a distant point for controlling the circuit of said electromagnet, substantially as described.

8. In an electrical system for the operation of water-tight bulkhead-doors, hatches or the like, the combination with a door or hatch, of an electric motor geared to said door or hatch, a motor-controlling switch electrically connected to said motor, means for connecting said controller and motor to a source of current-supply, an electromagnet arranged to operate said motor-controlling switch, an emergency-circuit for energizing said magnet, and a switch located at a distance from said magnet for controlling said circuit, and means for operating said controller normally independently of the said magnet, substantially as described.

9. In an electrical system for the operation of water-tight bulkhead-doors, hatches or the like, the combination with a door or hatch, of an electric motor geared to said door or hatch, a motor-controlling switch electrically connected to said motor, means for connecting said controller and motor to a source of current-supply, an electromagnet arranged to operate said motor-controlling switch, an emergency-circuit for energizing said magnet, a switch arranged to control said circuit, and a handle on said controller for operating it independently of the said magnet, substantially as described.

10. In an electrical system for the operation of water-tight bulkhead-doors, hatches or the like, the combination with a door or hatch, of an electric motor geared to said door or hatch, a motor-controlling switch electrically connected to said motor, means for connecting said controller and motor to a source of current-supply, an electromagnet arranged to operate said motor-controlling switch, a circuit for energizing said electromagnet, a switch located at a distance from said magnet and arranged to control said circuit, and means for automatically returning said controller to its initial position after operation, substantially as described.

11. In an electrical system for the operation of water-tight bulkhead-doors, hatches or the like, the combination with a door or hatch, of an electric motor geared to said door or hatch, a motor-controlling switch electrically connected to said motor, means for connecting said controller and motor to a source of current-supply, an electromagnet arranged to operate said motor-controlling switch, a circuit for energizing said electromagnet, a switch located at a distance from said magnet and arranged to control said circuit, a handle on said controller for operating it independently of said magnet, and a spring arranged to automatically return said controller to its initial position after operation, substantially as described.

12. In combination, a system of doors, an electric motor for operating each door, a controlling-switch for each motor composed of two members connected together, a control system comprising electroresponsive operating means for operating one of the members of the several controlling-switches, control-wires extending to a distant station and switches at said distant station, and a handle mechanically connected to the other member of each controlling switch and adapted to move both members independently of said control system and whether said operating means are energized or not, substantially as described.

13. In combination with an electric motor, a manually operated reversing-switch for said motor, composed of two members connected together, means for maintaining one member of said switch normally in its off position, and means controllable from a distant point for moving said maintaining means into a position to bring the said switch into one of its operative positions, substantially as described.

14. In combination with an electric motor, a manually-operated reversing-switch for said motor composed of two members connected together, means for maintaining one member of said switch normally in its off position, an electromagnet for moving said maintaining means into a position to close said switch, and means located at a distant point for controlling the circuit of said electromagnet, substantially as described.

15. In combination with an electric motor, a manually-operated reversing-switch for said motor composed of two members connected together, maintaining means constructed and arranged to maintain one member of said switch normally in its off position but to permit a free movement of the entire switch through its manually-operated means, means for moving said maintaining means into a position to close the switch, and means located at a distant point for controlling the operation of the latter means, substantially as described.

16. In combination, a manually-operated switch composed of a plurality of members having a plurality of operative positions, means for maintaining one member of said switch normally in its off position, and means controllable from a distance and acting upon said maintaining means to shift said member and thereby throw said switch to an operative position, substantially as described.

17. In combination, a manually-operated switch composed of a plurality of members and having a plurality of operative positions, means for maintaining one member of said switch normally in its off position, an electromagnet acting upon said maintaining means to shift said member and thereby throw said switch to an operative position, and a switch at a distant station controlling the circuit of said electromagnet, substantially as described.

18. In combination, a device to be moved, an electric motor for operating said device, a controlling-switch for said motor composed of a plurality of members, electroresponsive means controllable from a distance and adapted to operate one member and thereby throw said switch, connections between said switch and said means, and manually-operated means near said device for moving the entire switch independently of said electroresponsive means, substantially as described.

19. In combination, a device to be moved, a motor for operating said device, a controller for said motor composed of a plurality of members, means for operating one member of said controller from a distance, connections between said controller and said operating means, and manually-controlled means near said device adapted to move all the members of said controller independently of said operating means, substantially as described.

20. In combination, a device to be moved, an electric motor adapted to operate said device, a controlling-switch for said motor composed of a plurality of members connected together, a solenoid having its core positively connected to one member of said switch and adapted when energized to move said member and thereby said switch to one of its running positions, and means for moving all the members of said switch to another position without disturbing the circuit of said solenoid, substantially as described.

21. In combination, a device to be moved, an electric motor adapted to operate said device, a controlling-switch for said motor, composed of a plurality of members connected together, a solenoid adapted when energized to move one of said members and thus to bring said switch to one of its running positions, connections between said member of said switch and said solenoid, and means for manually moving said switch to another position without disturbing the current through said solenoid, substantially as described.

22. In combination, a device to be moved, a motor for operating said device, a controller for said motor, composed of a plurality of members connected together, means for operating one member of said controller from a distance, and thereby completing the circuit through the controller, connections between said controller and said operating means, and means near said device for moving said controller without disturbing said operating means, substantially as described.

23. In combination, a system of doors, a motor for operating each door, a controller for each motor, composed of a plurality of members connected together, a control system comprising a distant station and operating means for one member of each of the several controllers controlled from the distant station, whereby the circuit is closed through said controller, and connections between each controller and its operating means, whereby each controller may be moved without disturbing the operating means, substantially as described.

24. In combination, a system of doors, an electric motor for operating each door, a controlling-switch for each motor, composed of a plurality of members connected together, a control system adapted to operate one member of each of said switches, thereby throwing said switches simultaneously, and means at each door for moving the switch at that door independently of the control system and without disturbing the connections thereof, substantially as described.

25. In combination, a system of doors, an electric motor for operating each door, a controlling-switch for each motor, composed of a plurality of members connected together, a control system comprising electroresponsive operating means for one member of each of the several controlling-switches, control-wires extending to a distant station and switches at said distant station, and connections between each controlling-switch and its operating means, whereby one member of each controlling-switch may be moved and the switch thrown without disturbing the operating means or disturbing the connections of the control system, substantially as described.

26. In combination, an electric motor, a manually-operated reversing-switch therefor, means for holding said switch normally in one operative position, and a switch controllable locally or from a distance for completing the motor-circuit.

27. In combination, an electric motor, a manually-operated reversing-switch therefor, means for holding said switch normally in one operative position, and a switch controllable locally or from a distance for completing the motor-circuit when said reversing-switch is in said position, said reversing-switch being arranged in its other position to complete the motor-circuit independently of the other switch.

28. In combination, an electric motor, a reversing-switch therefor, means for holding said switch normally in one operative position, an operating-handle for said switch, a magnetically-operated switch adapted to complete the motor-circuit, and mechanical connections between said operating-handle and said magnetically-operated switch.

29. In combination, an electric motor, a reversing-switch therefor, means for holding said switch normally in one operative position, an operating-handle for said switch, a magnetically-operated switch adapted to complete the motor-circuit when said reversing-switch is in said position, said reversing-switch being arranged in its other position to complete the motor-circuit independently of the magnetically-operated switch, and mechanical connections between said operating-handle and said magnetically-operated switch.

30. In combination, an electric motor, a reversing-switch therefor, means for holding said switch normally in one operative position, a switch controllable from a distance and adapted to complete the motor-circuit, said reversing-switch being arranged in its other operative position to complete the motor-circuit independently of the second switch, an operating-handle, and operative connections between said handle and both of said switches whereby said reversing-switch is moved to its other position when said handle is moved in one direction, and the second switch is moved to its closed position when said handle is moved in the other direction.

31. In combination, an electric motor, a reversing-switch therefor, means for holding said switch normally in one operative position, a switch controllable from a distance and adapted to complete the motor-circuit, an operating-handle, and operative connections between said handle and both of said switches.

32. In a controller for electric motors, a manually-operated shaft, a reversing-switch loosely journaled thereon, means for holding said switch normally in one operative position, a switch controllable from a distance, a member loosely journaled on said shaft and adapted when moved to move the second switch to closed position, and operative connections between said shaft and both said reversing-switch and said member whereby said switch or said member is moved when said shaft is moved in one direction or the other.

33. In combination, a system of doors, a motor for raising and lowering each door, a reversing-switch for each motor, means for holding each switch normally in lowering position, a second switch for each motor adapted to complete the motor-circuit when the reversing-switch is in lowering position, means controllable from a distant point for operating the circuit-completing switches for the several doors, and means at each door for manually closing said circuit-completing switch or moving said reversing-switch to its raising position.

34. In combination, a system of doors, a motor for raising and lowering each door, a reversing-switch for each motor, means for holding each switch normally in lowering position, a second switch for each motor adapted to complete the motor-circuit when said reversing-switch is in lowering position, said reversing-switch being arranged in raising position to complete the motor-circuit independently of the second switch, an electromagnet for each circuit-completing switch, means at a distant point for controlling the circuits of the several electromagnets, and means at each door for manually closing the circuit-completing switch at that door or moving the reversing-switch to its raising position.

In testimony whereof I affix my signature in presence of two witnesses.

WILLIAM BARNUM COWLES.

Witnesses:
ERNEST WILKENSON,
HARRY A. KINCHLEY.